Nov. 20, 1956 S. KELLY ET AL 2,771,514

ELECTROMECHANICAL TRANSDUCERS

Filed March 10, 1952

Inventors:
Stanley Kelly,
John Watson Brownlee,
By Pierce, Scheffler & Parker,
Attorneys.

2,771,514

ELECTROMECHANICAL TRANSDUCERS

Stanley Kelly and John Watson Brownlee, Enfield, England, assignors to Cosmocord Limited, Enfield, England, a British company Application March 10, 1952, Serial No. 275,776

6 Claims. (Cl. 179—100.41)

Figures 1, 2, 3, 4:
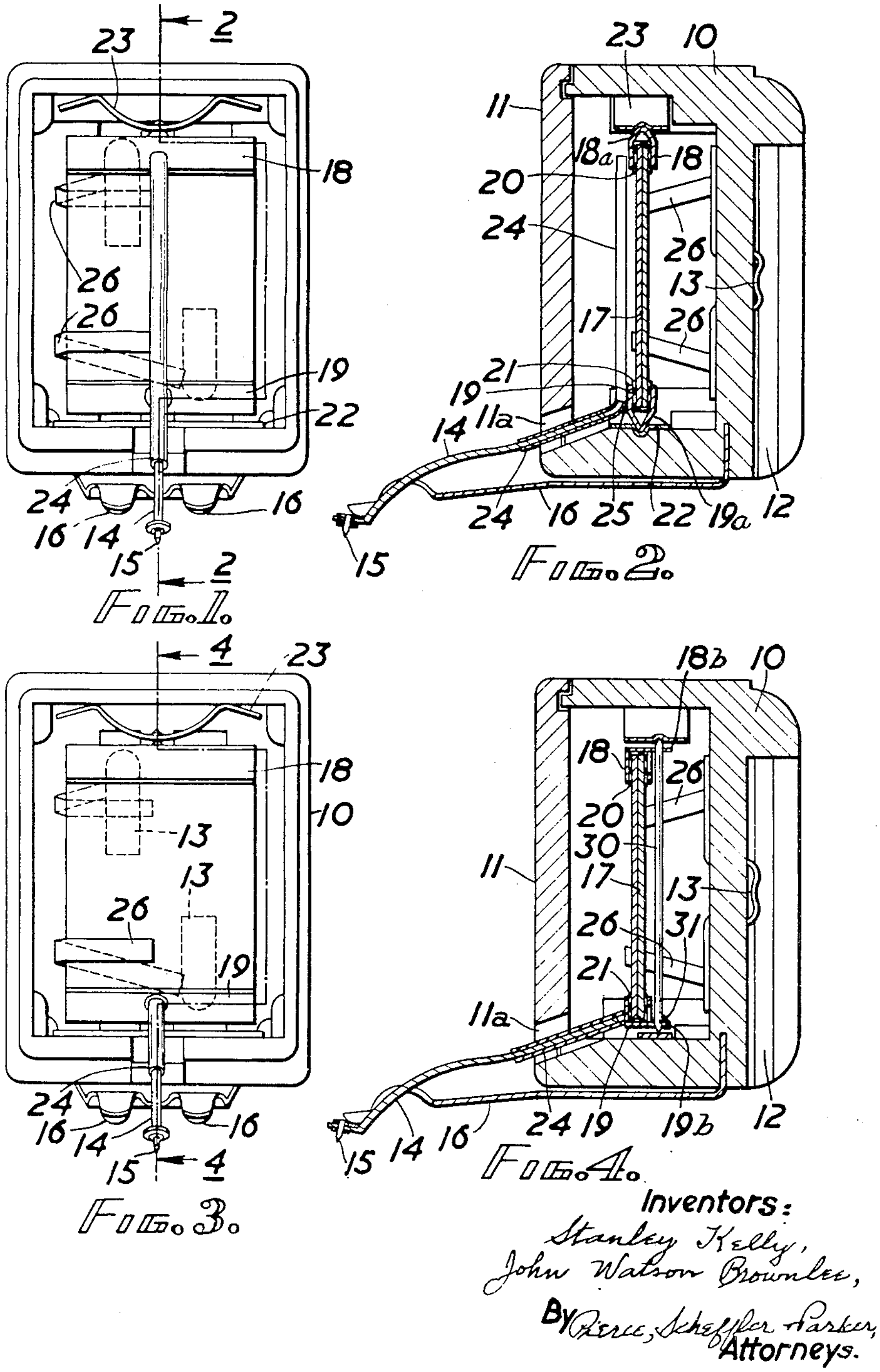

This invention relates to electromechanical transducers of the type comprising a piezo-electric element such as a crystal, a stylus adapted to engage, for example, the groove of gramophone record, and a mechanical coupling between the stylus and the element.

In a known form of transducer of this type the stylus is carried at the end of a cantilever arm, the other end of which is connected to a crystal; the crystal is mounted by pivots at its top and bottom parts, so as to be rotatable about a vertical axis and the cantilever arm is connected to the crystal near the bottom so as to cause the lower part of the crystal to be oscillated.

An arrangement of this type can be made to perform very satisfactorily, but is liable to damage the crystal if by accident or otherwise the cantilever arm is bent upwardly at the stylus end, and the protecting arm which is usually provided to prevent fracture of the crystal does not always do so.

The present invention has for its object to provide an improved form of construction of piezo-electric transducer of the type referred to, in which the danger of fracture to the element is eliminated or reduced.

In accordance with the invention means are provided whereby in the event of excessive movement of the cantilever arm occurring the force thereby applied to the crystal is limited by means which are substantially independent of the element.

Other features and details of the invention will be apparent from the following description of two embodiments thereof as applied to gramophone pickups in conjunction with the accompanying drawing, in which:

Figure 1 is a front view of one embodiment with the front wall of the casing removed, Figure 2 is a longitudinal sectional view, on the line 2—2 of Figure 1, with the front wall in position, Figure 3 is a view similar to Figure 1, of a second embodiment, and Figure 4 is a view similar to Figure 2 of the embodiment of Figure 3, the sectional line in this case being the line 4—4 of Figure 3.

In the construction of pickup shown in Figures 1 and 2, the pickup comprises a box-like body 10 of moulded insulating material the front of which is closed by a separate cover. The body has grooves 12 on the back by which it can be held on the end of a support arm in known manner; electrical contacts 13 are also provided on the back.

The cantilever arm 14, which carries a small sapphire stylus 15 at its end, extends forwardly and downwardly from the body, through an opening 11a in the lower edge of the cover. A forked protecting arm 16 also extends forwardly from the body, this arm being moulded at its end as an insert in the body. The protecting arm 16 normally lies clear of the record surface when the pickup is in use, but engages the record should the pickup be dropped, thus relieving the strain on the arm.

The cantilever arm 14 is made from metal strip of rectangular or other cross section so that the arm has substantially greater vertical than horizontal compliance. The moving system of the pickup, which is actuated by the cantilever arm 14, includes a bimorph piezo-electric crystal element 17 of the "twister" type pivotally mounted in the body. The element is rectangular in shape and is disposed vertically in the body, with pivots adjacent the middle of its top and bottom edges. The top and bottom edges of the element are respectively embraced by small channel section metal clips 18 and 19 with strips 20 and 21 of thin rubber or like material interposed. Small coned projections 18*a*, 19*a* forming pivots, are made on the strips, and these pivots engage suitable depressions, forming pivot-cups; the lower pivot cup is formed as a depression in a flat metal plate 22 in the bottom of the body, and the upper pivot cup by a depression in a strip 23 of curved resilient metal which provides the necessary pressure to keep the pivots in the cups.

The element lies in the transverse plane of the casing as shown, and is oscillated about this plane by the cantilever arm. To this end, the cantilever arm is coupled to the bottom clip 19 on the element; a small gauge metal tube 24 is soldered at 25 to the middle of the clip, the tube being bent forwardly and downward and receiving the end of the cantilever arm 14.

As thus far described the cantilever arm will oscillate the piezo-element in the desired manner but in the event of the arm 14 by mischance being bent upwardly through an excessive distance there will be a substantial strain on the crystal element immediately about the bottom clip 19. The force exerted by the arm tends to turn the element backwardly about the bottom pivot 19*a*, this movement being opposed by the reaction created at the top pivot 18*a*. The reaction force is thus transmitted by the crystal.

To reduce force and hence the strain in the crystal, a rigid member, in the form of the small tube 24 which is fastened to the bottom clip 19 is extended upwardly parallel with the element 17 to a point level with the top clip 18; the tube is located near to the clip but it may not be fixed thereto and may not actually touch it. When the arm is bent upwardly the top of the tube bears against the clip and the reaction force is transmitted predominantly through the tube, thus giving the necessary degree of protection to the crystal.

The pickup includes means for restraining the upper part of the crystal against pivotal motion in the horizontal plane, so as to produce the piezo-electric output. Such means may include damping pads between the crystal and the walls of the body, as shown in the pickup described in our copending application Serial No. 275,775, filed March 10, 1952, or the body can be filled with a viscous gel. Electrodes on the crystal surfaces are connected by the flexible leads 26 to the electric contacts 13 on the body.

In the second construction shown in Figures 3 and 4, the same general arrangement of casing, protecting arm and cantilever arm is adopted, and like parts in the four figures of drawing bear like reference. The construction is, however, modified insofar as the mounting of the crystal and the attachment of the cantilever arm is concerned. In Figures 3 and 4, the crystal 17 is embraced along its top and bottom edges by clips 18 and 19, as before, and the cantilever arm 14 is fixed in a small tube 24 soldered to the bottom clip, but this tube is no longer than is needed for this purpose. Instead of the pivots being formed upon the clips, a vertical pivot shaft 30 extends between the top and bottom pivot cups formed in members 23 and 22, and the clips 18 and 19 are secured to this shaft. The clips are secured to the shaft by two small lugs 18*b* and 19*b* each bent out of the one of the clips at its middle, the lugs being horizontal. The lugs 18*b*, 19*b* are pierced for the shaft 30 to pass through them and the lower lug is secured to the shaft by soldering or adhesive at 31.

With this construction the pivot shaft takes the major part of the strain imposed by excessive movement of the arm, and the danger of fracturing the crystal is very largely eliminated. With both constructions described the response of the pickup to vertical motion of the stylus is reduced, which is an advantage, as explained in our copending application, Serial No. 275,775 filed March 10, 1952.

We claim:

1. A gramophone pickup comprising a casing, a piezo-electric element mounted, aligned first and second pivot means at opposite edges of said element for mounting said element for pivotal movement in said casing, a cantilever arm, having a stylus thereon, connected to said element adjacent said first pivot means for transmission of motion to said element in response to motion imparted to said stylus in a desired direction by a record groove, and a rigid member extending longitudinally of and adjacent said element between said pivot means, said rigid member being secured rigidly to said element and only in the vicinity of said first pivot means for transmitting reaction forces imparted to said element in response to movement of said stylus in a direction generally at right angles to the said desired direction through said rigid member to said second pivot means.

2. A gramophone pickup comprising a casing, a piezo-electric element mounted in said casing by means of pivots located at spaced points on said element, a cantilever arm connected to said element in the region of one of said points, a stylus on said cantilever arm for engaging a record groove, said connection between said cantilever and element presenting a low compliance for motion of said cantilever corresponding to a desired motion of said stylus in following said groove, a relatively rigid member rigidly connected to said element in the region of the same point and extending to the region of the other of said points, said rigid member upon movement of said cantilever in a direction corresponding to a motion of said stylus at right angles to the said desired direction being engageable with said element in the region of the other of said points thereby to transmit the resultant force to the pivotal mounting at the other of the said points, substantially independent of said element.

3. A gramophone pickup for use with a lateral cut gramophone record comprising a casing, a plate-like piezo-electric crystal element of the twister type, first and second support members attached respectively along opposite edges of said element, aligned pivot means on said support members intermediate the ends of said edges mounting said element for pivotal movement in said casing about an axis which is approximately a medial line of said element, a cantilever arm secured rigidly to said first support member in the region of the pivot means thereon, a stylus carried by said cantilever arm for engaging a record groove, said cantilever arm having a low compliance for motion in a lateral direction in following the record groove, and a relatively rigid member secured rigidly to said first support member in the region of the pivot means thereon, said rigid member extending to said second support member and being spaced slightly laterally therefrom such that any movement of said cantilever arm in a direction at right angles to said lateral direction of movement is reflected by a movement of the end of said rigid member into engagement against said second support member.

4. A gramophone pickup as defined in claim 3 wherein said rigid member is integral with and constitutes an extension of said cantilever arm.

5. A gramophone pickup for use with a lateral cut gramophone record comprising a casing, a rigid pivot shaft having the opposite ends thereof received in first and second spaced pivot bearings in said casing, a plate-like piezo-electric crystal element of the twister type, first and second support members secured respectively along opposite edges of said element, said first support member being secured intermediate its ends rigidly to said pivot shaft in the region of said first pivot bearing, a cantilever arm rigidly secured to said first support member in the region of said first pivot bearing, and a stylus carried by said arm for engaging a record groove and which has a low compliance for motion in a lateral direction in following the record groove, the resultant force of any movement of said cantilever arm in a direction at right angles to said lateral direction of movement being transmitted through said pivot shaft to said second pivot bearing.

6. A gramophone pickup as defined in claim 5 wherein said second support member for the crystal element is supported loosely on said pivot shaft to thereby permit a slight pivotal movement between said pivot shaft and crystal element.

References Cited in the file of this patent

UNITED STATES PATENTS

| | | |
|---|---|---|
| 2,519,185 | Harris | Aug. 15, 1950 |
| 2,594,948 | Lynch | Apr. 29, 1952 |